(12) United States Patent
Kawara et al.

(10) Patent No.: US 11,041,787 B2
(45) Date of Patent: Jun. 22, 2021

(54) APERTURE ARRAY AND PRODUCTION METHOD THEREFOR

(71) Applicant: Murata Manufacturing Co., Ltd., Nagaokakyo (JP)

(72) Inventors: Naoki Kawara, Nagaokakyo (JP); Masaru Banju, Nagaokakyo (JP); Takashi Kondo, Nagaokakyo (JP); Seiji Kamba, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 503 days.

(21) Appl. No.: 15/480,808

(22) Filed: Apr. 6, 2017

(65) Prior Publication Data
US 2017/0212022 A1   Jul. 27, 2017

Related U.S. Application Data

(63) Continuation of application No. PCT/JP2016/051405, filed on Jan. 19, 2016.

(30) Foreign Application Priority Data

Jan. 22, 2015  (JP) .............................. JP2015-009996

(51) Int. Cl.
*G01N 1/40* (2006.01)
*G01N 21/3581* (2014.01)
(Continued)

(52) U.S. Cl.
CPC ....... *G01N 1/4077* (2013.01); *B01D 29/0093* (2013.01); *B01D 29/0095* (2013.01);
(Continued)

(58) Field of Classification Search
None
See application file for complete search history.

(56) References Cited

U.S. PATENT DOCUMENTS 2,964,194 A * 12/1960 Oliver, Jr. .............. B01D 33/23
  210/486
3,295,687 A *  1/1967 Schmerler .............. B01D 29/39
  210/486
(Continued)

FOREIGN PATENT DOCUMENTS

JP   H08-196828 A   8/1996
JP   S59-10879 A    8/1996
(Continued)

OTHER PUBLICATIONS

International Search Report issued in International Patent Application No. PCT/JP2016/051405, dated Mar. 15, 2016.
(Continued)

*Primary Examiner* — Robert J Popovics
(74) *Attorney, Agent, or Firm* — Arent Fox LLP

(57) ABSTRACT

A film-shaped aperture array includes a first principal surface and a second principal surface opposed to each other and a plurality of apertures penetrating the first principal surface and the second principal surface. A projection projecting from the second principal surface in a normal direction of the second principal surface is provided in at least one region in contact with three or more of the plurality of apertures in a part of the second principal surface, when viewed in plan from the normal direction of the second principal surface.

10 Claims, 10 Drawing Sheets

(51) Int. Cl.
  *B01D 29/00*  (2006.01)
  *B01D 29/56*  (2006.01)

(52) U.S. Cl.
  CPC ......... *B01D 29/56* (2013.01); *G01N 21/3581* (2013.01); *G01N 2001/4088* (2013.01)

(56) References Cited

U.S. PATENT DOCUMENTS

| | | | | |
|---|---|---|---|---|
| 3,390,771 A * | 7/1968 | Wehner | B07B 1/4645 | 209/365.1 |
| 3,390,962 A * | 7/1968 | Goldsmith | G01N 33/558 | 422/401 |
| 3,623,614 A * | 11/1971 | Schmidt, Jr. | B01D 29/111 | 210/486 |
| 3,664,503 A * | 5/1972 | Felden | B07B 1/4627 | 209/397 |
| 3,695,444 A * | 10/1972 | Laconelli | A23F 5/285 | 210/321.75 |
| 3,724,671 A * | 4/1973 | Tate | B01D 46/10 | 210/484 |
| 3,900,393 A * | 8/1975 | Wilson | B07B 1/4645 | 209/399 |
| 3,970,550 A * | 7/1976 | Fry | B07B 1/4645 | 209/399 |
| 3,980,555 A * | 9/1976 | Freissle | B07B 1/4645 | 209/408 |
| 4,039,247 A * | 8/1977 | Lawman | G02B 21/34 | 359/398 |
| 4,087,327 A * | 5/1978 | Feder | C12M 29/16 | 435/399 |
| 4,150,717 A * | 4/1979 | Balke | F23L 15/02 | 165/9.1 |
| 4,154,795 A * | 5/1979 | Thorne | B01L 3/5085 | 206/460 |
| 4,246,339 A * | 1/1981 | Cole | B01L 3/50255 | 422/534 |
| 4,276,169 A * | 6/1981 | Browne | B01D 33/09 | 210/404 |
| 4,493,815 A * | 1/1985 | Fernwood | B01D 61/18 | 210/232 |
| 4,690,360 A * | 9/1987 | Looker | B65D 88/14 | 248/346.02 |
| 4,729,949 A * | 3/1988 | Weinreb | C12M 23/12 | 435/30 |
| 4,737,288 A * | 4/1988 | Melis | B01D 21/0003 | 210/521 |
| 4,770,856 A * | 9/1988 | Uthemann | B01L 3/5085 | 422/22 |
| 4,832,905 A * | 5/1989 | Bryan | G21C 3/3206 | 210/488 |
| 4,851,210 A * | 7/1989 | Hewett | G01N 33/80 | 435/7.25 |
| 4,872,888 A * | 10/1989 | Ehrfeld | B01D 69/10 | 210/500.35 |
| 4,895,706 A * | 1/1990 | Root | B01D 61/18 | 422/534 |
| 4,900,507 A * | 2/1990 | Shallenberger | G21C 3/32 | 376/352 |
| 4,948,442 A * | 8/1990 | Manns | B01L 3/50255 | 156/268 |
| 4,948,564 A * | 8/1990 | Root | B01D 61/18 | 422/534 |
| 5,037,605 A * | 8/1991 | Riordan, III | G21C 3/32 | 376/352 |
| 5,047,215 A * | 9/1991 | Manns | B01L 3/5025 | 210/473 |
| 5,076,924 A * | 12/1991 | Persson | B01D 29/39 | 210/474 |
| 5,084,246 A * | 1/1992 | Lyman | B01L 3/50255 | 356/246 |
| 5,131,709 A * | 7/1992 | Spica | B60R 9/00 | 105/423 |
| 5,141,719 A * | 8/1992 | Fernwood | B01D 61/18 | 210/323.1 |
| 5,256,360 A * | 10/1993 | Li | B01D 29/111 | 264/219 |
| 5,286,944 A * | 2/1994 | Li | B23K 15/08 | 204/289 |
| 5,330,644 A * | 7/1994 | Nilsson | B01D 33/23 | 210/323.1 |
| 5,345,483 A * | 9/1994 | Johansson | G21C 3/3206 | 376/313 |
| 5,356,692 A * | 10/1994 | Perez | B29C 33/30 | 118/33 |
| 5,361,287 A * | 11/1994 | Williamson | G21C 3/3206 | 376/352 |
| 5,364,458 A * | 11/1994 | Burnett | B03C 3/155 | 55/496 |
| 5,383,314 A * | 1/1995 | Rothberg | E02D 31/02 | 405/43 |
| 5,407,563 A * | 4/1995 | Blake | B01D 33/067 | 210/155 |
| 5,476,526 A * | 12/1995 | Attermeyer | B01D 46/0002 | 55/496 |
| 5,514,343 A * | 5/1996 | Verwohlt | B01L 3/5085 | 211/74 |
| 5,528,640 A * | 6/1996 | Johansson | G21C 3/3206 | 376/310 |
| 5,571,721 A * | 11/1996 | Turner | B01L 3/5085 | 359/398 |
| 5,609,826 A * | 3/1997 | Cargill | B01J 19/0046 | 422/527 |
| 5,656,167 A * | 8/1997 | Martz | A41D 31/02 | 210/490 |
| 5,779,907 A * | 7/1998 | Yu | B01L 3/5085 | 210/695 |
| 5,797,975 A * | 8/1998 | Davis | B01D 46/0013 | 55/483 |
| 5,972,694 A * | 10/1999 | Mathus | B01L 3/50255 | 422/534 |
| 6,000,094 A * | 12/1999 | Young | A47L 13/58 | 15/260 |
| 6,054,100 A * | 4/2000 | Stanchfield | B01J 19/0046 | 422/534 |
| 6,338,802 B1 * | 1/2002 | Bodner | B01D 61/18 | 210/261 |
| 6,436,351 B1 * | 8/2002 | Gubernator | B01J 19/0046 | 210/257.2 |
| 6,479,300 B1 * | 11/2002 | Jiang | B01D 15/3828 | 210/198.2 |
| 6,627,291 B1 * | 9/2003 | Clark | B01D 61/18 | 210/500.1 |
| 6,827,905 B2 * | 12/2004 | Shanler | B01L 3/0244 | 422/503 |
| 6,899,810 B1 * | 5/2005 | Pitt | B01D 61/18 | 210/321.68 |
| 6,982,058 B2 * | 1/2006 | Jacobson | A61F 2/00 | 264/400 |
| 7,048,856 B2 * | 5/2006 | Fissell, IV | C12N 13/00 | 210/645 |
| 7,388,217 B2 * | 6/2008 | Buschbeck | H01J 37/304 | 250/492.23 |
| 7,470,544 B2 * | 12/2008 | Sharma | G01N 27/4145 | 216/16 |
| 7,534,338 B2 * | 5/2009 | Hafeman | B01L 3/50255 | 204/216 |
| 7,573,031 B2 * | 8/2009 | Behar | B01L 3/508 | 250/310 |
| 8,113,357 B2 * | 2/2012 | Johnson | B07B 1/4645 | 209/397 |
| 8,304,732 B2 * | 11/2012 | Kamba | G01N 21/3581 | 250/341.3 |
| 8,610,071 B2 * | 12/2013 | Kamba | G01N 21/3581 | 250/339.07 |
| 8,936,160 B2 * | 1/2015 | Van Rijn | B01D 63/08 | 210/483 |
| 9,117,762 B2 * | 8/2015 | Shin | H01L 21/0337 | |
| 9,329,125 B2 | 5/2016 | Kondo et al. | | |

(56) References Cited

U.S. PATENT DOCUMENTS

| | | | |
|---|---|---|---|
| 9,789,235 B2 * | 10/2017 | Gifford | A61M 1/3693 |
| 10,081,013 B2 * | 9/2018 | Hale | G01N 1/4077 |
| 10,349,908 B2 * | 7/2019 | Yun | A61B 6/484 |
| 10,371,634 B2 * | 8/2019 | Rothberg | C12Q 1/6874 |
| 10,408,750 B2 * | 9/2019 | Kondo | G01N 21/01 |
| 10,946,318 B2 * | 3/2021 | Thysell | B01D 33/21 |
| 2002/0025536 A1 * | 2/2002 | Gyuris | A61P 31/00 435/7.1 |
| 2002/0094533 A1 * | 7/2002 | Hess | B01L 3/0262 435/6.14 |
| 2002/0172940 A1 * | 11/2002 | Gyuris | C40B 40/02 435/5 |
| 2005/0201246 A1 * | 9/2005 | Buschbeck | H01J 37/304 369/101 |
| 2006/0000786 A1 * | 1/2006 | Tueshaus | B07B 1/4672 210/767 |
| 2007/0125956 A1 * | 6/2007 | Buschbeck | H01J 37/304 250/396 R |
| 2007/0151920 A1 * | 7/2007 | Kay | B01D 29/012 210/500.1 |
| 2007/0175802 A1 * | 8/2007 | Johnson | B07B 1/4645 209/397 |
| 2009/0215640 A1 * | 8/2009 | West | G01N 33/56966 506/9 |
| 2010/0025586 A1 * | 2/2010 | Ogawa | G01N 21/3581 250/341.1 |
| 2012/0153159 A1 * | 6/2012 | Kamba | G01N 21/3581 250/341.3 |
| 2012/0228238 A1 * | 9/2012 | Van Rijn | A23C 9/1524 210/767 |
| 2013/0065771 A1 * | 3/2013 | Oroskar | B01L 3/50255 506/9 |
| 2013/0221209 A1 * | 8/2013 | Kamba | G01N 21/3581 250/225 |
| 2013/0330721 A1 * | 12/2013 | Tang | A61P 7/08 435/6.11 |
| 2015/0110836 A1 * | 4/2015 | Glanville | G16B 30/00 424/208.1 |
| 2015/0198527 A1 | 7/2015 | Kondo et al. | |
| 2016/0011104 A1 * | 1/2016 | Kondo | G01N 21/3586 250/339.07 |
| 2016/0041075 A1 | 2/2016 | Kamba et al. | |
| 2016/0054223 A1 | 2/2016 | Kamba et al. | |
| 2016/0146823 A1 * | 5/2016 | Chiu | G01N 15/1456 506/9 |
| 2017/0100713 A1 * | 4/2017 | Hale | G01N 1/4005 |
| 2017/0212022 A1 * | 7/2017 | Kawara | G01N 21/3581 |
| 2017/0312674 A1 * | 11/2017 | Myerson | B01D 43/00 |
| 2018/0222944 A1 * | 8/2018 | Glanville | A61K 38/46 |
| 2019/0375798 A1 * | 12/2019 | Glanville | A61K 39/0011 |

FOREIGN PATENT DOCUMENTS

| | | | | |
|---|---|---|---|---|
| JP | H11-276820 A | 10/1999 | | |
| JP | 2002-277358 A | 9/2002 | | |
| JP | 2007-139445 A | 6/2007 | | |
| JP | 2010-42349 A | 2/2010 | | |
| JP | 2011072910 A | 4/2011 | | |
| WO | WO 2012/029629 A1 | 3/2012 | | |
| WO | WO-2012029629 A1 * | 3/2012 | | G01N 21/01 |
| WO | WO 2014/050328 A1 | 4/2014 | | |
| WO | WO-2014156670 A1 * | 10/2014 | | G01N 21/01 |
| WO | WO 2014/192917 A1 | 12/2014 | | |

OTHER PUBLICATIONS

Written Opinion issued in International Patent Application No. PCT/JP2016/051405, dated Mar. 15, 2016

* cited by examiner

APERTURE ARRAY AND PRODUCTION METHOD THEREFOR

CROSS REFERENCE TO RELATED APPLICATIONS

The present application is a continuation of International application No. PCT/JP2016/051405, filed on Jan. 19, 2016, which claims priority to Japanese Patent Application No. 2015-009996, filed on Jan. 22, 2015, the entire contents of each of which are incorporated herein by reference.

TECHNICAL FIELD

The present invention relates to a aperture array and a production method therefor.

BACKGROUND ART

There is known a method for measuring, for example, the number of objects (measurement objects) in a specimen, in which an aperture array having a plurality of apertures is used as a filter. The objects in the specimen are collected in the aperture array, and the aperture array with the objects collected therein is offered for measurement.

Here, when the objects are minute objects contained in fluid (specimen), for example, PM 2.5 existing in the atmosphere or endoplasmic reticulums contained in the blood, a porous (mesh-shaped) structure having apertures smaller than those minute objects is needed to collect the objects.

However, there are technical limitations to micronization of the apertures. As the size of the apertures decreases (for example, 1 μm or less), the production cost is increased, for example, by the decrease in yield rate and complication of the production process and equipment.

Paragraph [0047] and FIG. 8 of Patent Document 1 (International Publication No. 2014/192917 see also US2016041075 A1 and US2016054223 A1) and Patent Document 2 (Japanese Unexamined Utility Model Registration Application Publication No. 59-10879) each disclose a aperture array formed by stacking two aperture array parts having a plurality of through apertures (apertures) so that one of the apertures of one of the aperture array parts overlaps with only one of the apertures of the other aperture array part. By thus producing a filter, a filter having fine apertures can be produced relatively easily.

Patent Document 3 (Japanese Unexamined Patent Application Publication No. 2010-42349) and Patent Document (Japanese Unexamined Patent Application Publication No. 11-276820) each disclose a filter (aperture array) having finer meshes, in which a net-shaped structure is formed by stacking groups of wires arranged in parallel and in two layers so that the orientations of the groups are 90° different and further stacking a plurality of net-shaped structures so that the positions of meshes thereof are not aligned with each other.

The thickness of the aperture array is preferably small within such a range that the required mechanical strength can be maintained. This is because, when the aperture array is used as a filter, as the thickness of the aperture array increases, the pressure loss at the passage of fluid through the aperture array generally increases. When the pressure loss of the aperture array increases, the flow velocity decreases or it becomes difficult to run the fluid through the aperture array. This decreases treatment efficiency. When the thickness of the aperture array increases, in a case in which the aperture array is used as a measuring device, the influence of adhesion of objects (the measurement objects) decreases, and therefore, the measurement sensitivity decreases.

However, the total thickness of the aperture array disclosed in Patent Documents 1 and 2 becomes large because the thicknesses of the two aperture array parts are used. Further, in the aperture array disclosed in Patent Documents 3 and 4, at least four layers of wire groups need to be stacked to form meshes smaller than the meshes formed by the two layers of groups of wires arranged in parallel. Therefore, the thickness of the aperture array disclosed in Patent Documents 3 and 4 further increases.

In view of the above circumstances, an object of the present invention is to provide a thin aperture array having sufficient strength while including fine apertures, and a production method for the aperture array.

BRIEF DESCRIPTION OF THE INVENTION

The invention includes an aperture array, comprising: first and second opposed principal surfaces, the second principal surface being planar; a plurality of apertures penetrating the first and second principal surfaces; and at least one projection projecting from the second principal surface in a direction normal to the second principal surface and extending away from the first principal surface, at least one of the at least one projection abutting a respective set of three or more of the apertures.

The apertures are preferably arrayed in a quasiperiodic or periodic structure. The thickness of the aperture array, as measured in a direction perpendicular to the second principal surface is, except for the locations of the one or more projections, preferably 30 μm or less. The apertures are. for example, square in shape and the size of sides of the square is 0.5 μm or less.

In the preferred embodiments, the first and second principal surfaces are planar and parallel to one another. However, there are a plurality of projections extending from the second principal surface, each of the projection preferably abuts a respective set of at least three of the apertures.

The aperture array is preferably conductive or semiconductive. The apertures can be, for example, square in shape, triangular in shape or marquis in shape.

The invention is also directed towards a method for forming an aperture array, comprising:

forming a first structure having a first pattern of apertures;

forming a second structure having a second pattern of apertures on top of the first structure such that each of a plurality of the apertures in the second structure overlap portions of a respective set of at least three apertures of the first structure;

the first and second structures cooperating to define an aperture array having:

first and second opposed principal surfaces;

a third set of apertures which are smaller than the apertures of the first and second array of apertures; and one or more projections extending away from the second principal surface in areas where the first and second structures overlap.

The first surface of the aperture array is preferably planar and lies in a first plane and the second surface is preferably planar except for the locations of the projections. The second plane of the second surface is preferably parallel to the first plane. The projections preferably project away from the second surface in a direction perpendicular to the plane of the first surface and in a direction away from the first surface.

The third set of apertures are preferably arrayed in a quasiperiodic or periodic manner. A thickness of the aperture array, as measured in a direction perpendicular to the first principal surface is, except for the locations of the one or more projections, preferably 30 µm or less. The apertures are preferably square in shape and the size of sides of the square is 0.5 µm or less. Alternatively the shape of the apertures can be, for example, triangular or marquis in shape.

There are preferably a plurality of projections, each projection abutting a respective set of at least three of the apertures of the third set of apertures.

The invention is also directed towards a method for filtering for filtering biological cells. The method comprises:
    providing an aperture array comprising:
    a first and second opposed principal surfaces, the second principal surface being planar;
    a plurality of apertures penetrating the first and second principal surfaces; and
    at least one projection projecting from the second principal surface in a direction normal to the second principal surface and extending away from the first principal surface, at least one of the at least one projection abutting a respective set of three or more of the apertures;
    passing a fluid containing the biological cells through the apertures of the aperture array.

The fluid is preferably passed through the apertures in a direction extending from the first principal surface to the second principal surface.

According to the present invention, it is possible to provide the aperture array having a small thickness, fine apertures and a sufficient strength. In addition, the disclosed method for producing the aperture array is simple and efficient.

BRIEF DESCRIPTION OF DRAWINGS

FIG. 10(a) shows the result of the first example, FIG. 10(b) shows the result of the first comparative example, and FIG. 10(c) shows the result of the second comparative example.

DESCRIPTION OF PREFERRED EMBODIMENTS

Figure 1:
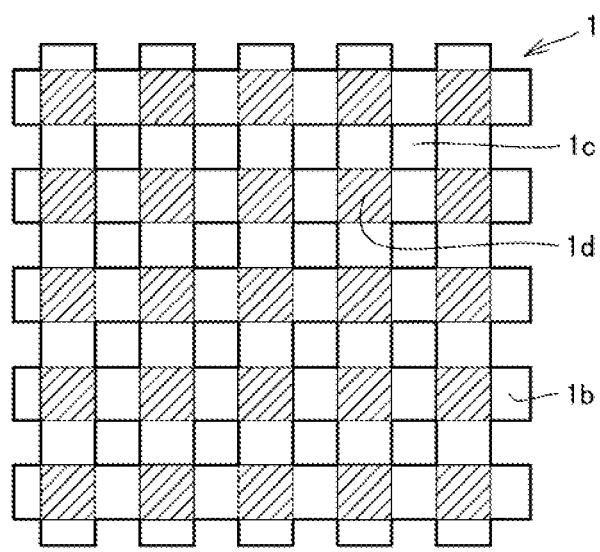
FIG. 1 is a schematic plan view illustrating a structure of an aperture array according to a first embodiment.

Embodiments of the present invention will be described below with reference to the drawings. In the drawings, the same reference numerals denote the same parts or corresponding parts. The dimensional relationships, such as length, width, thickness and depth, are appropriately changed to clarify and simplify the drawings, but do not show actual dimensional relationships.

Each of the embodiments is illustrative and the structures shown in different embodiments can be partially replaced or combined. In a second and subsequent embodiments, description of matters common to the first embodiment will be omitted, and only different points will be described. In particular, similar operational advantages based on similar structures will not be repeatedly described in every embodiment.

First Embodiment

Figure 2A:
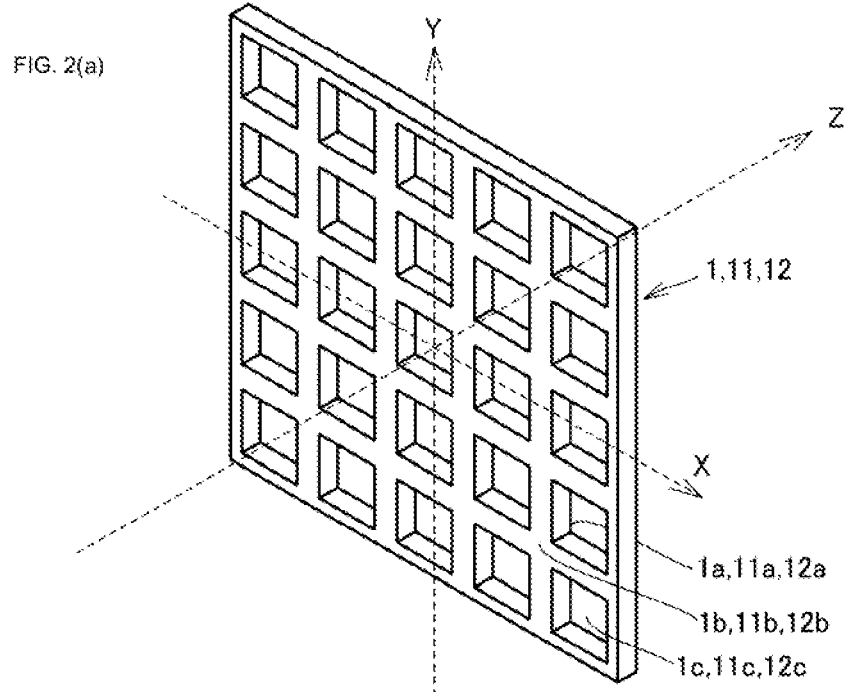
FIG. 2(a) is a schematic perspective view of the structure of the aperture array of the first embodiment.

Basically, as illustrated in FIG. 2(a), an aperture array 1 according to this embodiment is a film-shaped structure including a pair of opposed first and second principal surfaces 1a and 1b, respectively. A plurality of apertures 1c penetrate the first and second principal surfaces 1a and 1b.

However, as illustrated in FIG. 1, the aperture array 1 of this embodiment is characterized in that projections projecting from the second principal surface 1b in the normal direction of the first principal surface 1a (i.e., in a direction normal to the first principal surface) are provided in a plurality of regions 1d each of which abuts a respective set of four of the apertures 1c when viewed in plan from the normal direction of the first principal surface 1a (but from the side of the second principal surface). The projections are not illustrated in FIGS. 2(a) and 2(b).

While the projections of the first embodiment each abut four apertures, the invention encompasses projections which abut three or more apertures. These projections reinforce portions of the aperture array to which stress is applied from three or more directions and increase the strength of the aperture array. Therefore, the aperture array of this embodiment can maintain sufficient strength even when the thickness thereof is small.

For example, FIG. 1 of International Publication No. 2012/29629 discloses an aperture array (a periodic structure) composed of unit structures in each of which a projection projecting in the direction perpendicular to the principal surface is provided in each region abutting two apertures (a middle portion of a crosspiece). However, this projection is not provided in a region in contact with three or more apertures, and cannot reinforce this region on which stress is applied from three or more directions.

Figure 2B:
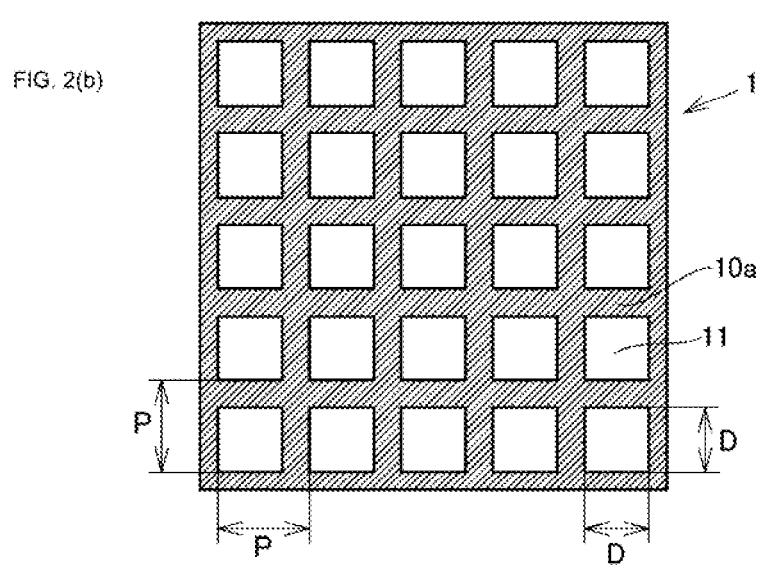
FIG. 2(b) is a schematic plan view of the structure of the aperture array of the first embodiment.

In the embodiment of FIGS. 2(a) and 2(b), the apertures 1c are periodically arranged in vertical and horizontal directions as viewed in the figures. However, some or all of the apertures 1c may arranged aperiodically as long as the aperiodic arrangement does not impair the effects of the present invention.

The aperture array 1 is preferably a quasiperiodic structure or a periodic structure. A quasiperiodic structure refers to a structure that does not have translational symmetry, but maintains order in the arrangement. As the quasiperiodic structure, for example, a Penrose structure is given as an example of a two-dimensional quasiperiodic structure. A periodic structure refers to a structure that has space symmetry represented by translational symmetry and is preferably a two-dimensional periodic structure. The two-dimensional periodic structure can be, for example, a mesh filter or a two-dimensional diffraction grating.

An example of the two-dimensional periodic structure is a film-shaped structure or grating-shaped structure (i.e., a flat structure) in which the apertures 1c are arranged at regular intervals in a matrix, as illustrated in FIG. 2. The aperture array 1 illustrated in FIG. 2 is a film-shaped structure in which square apertures 1c are arranged at regular intervals in two arrangement directions parallel to sides of the squares (vertical direction and horizontal direction in the figures) when viewed from the normal direction of the first principal surface 1a (second principal surface 1b).

It is preferable that at least a part of the aperture array 1 including its surfaces should be formed by a conductor, and it is more preferable that the aperture array is entirely formed by a conductor. Here, the term conductor refers to an object (substance) that conducts electricity, and includes not only metal but also a semiconductor.

Examples of the metal include nickel, gold, silver, copper, platinum, iron, chromium, silicon, germanium, and an alloy containing these materials. The metal is preferably nickel, gold, silver, copper, platinum, and chromium, and more preferably nickel and gold.

Examples of the semiconductor include compound semiconductors such as a group IV semiconductor (for example, Si, Ge), a group II-VI semiconductor (for example, ZnSe, CdS, ZnO), a group III-V semiconductor (for example, GaAs, InP, GaN), a group IV compound semiconductor (for example, SiC, SiGe), and a group I-III-VI semiconductor (for example, CuInSe2), and an organic semiconductor.

Figure 3A:
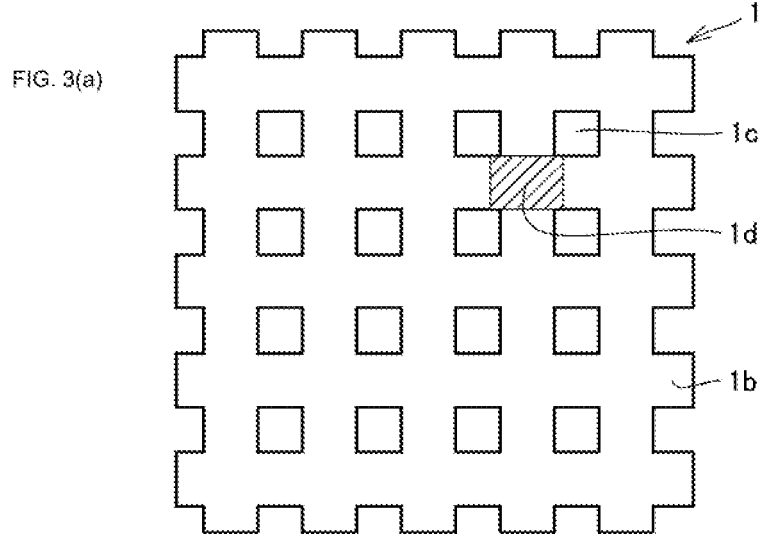
FIG. 3(a) is a schematic plan view illustrating a structure of a modification of the aperture array according to the first embodiment.
Figure 3B:
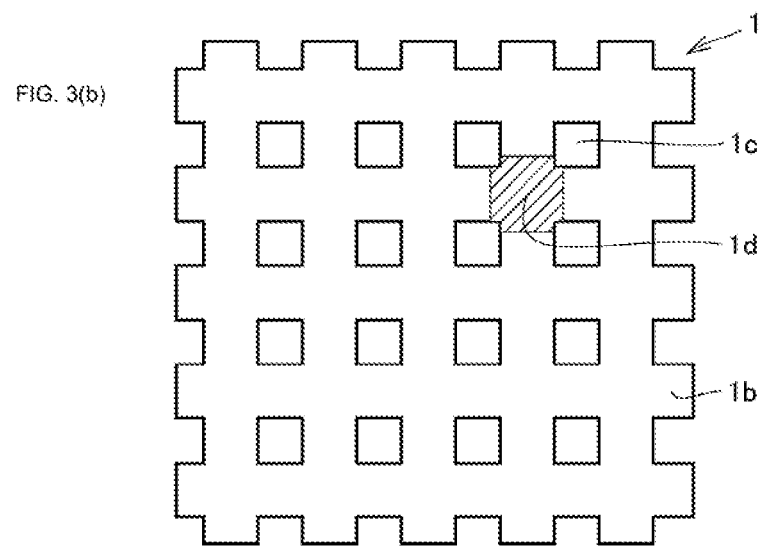
FIG. 3(b) is a schematic plan view illustrating a structure of another modification of the aperture array according to the first embodiment.

While each of the regions 1d illustrated in FIG. 1 abuts (contacts or extends to) a plurality of apertures 1c in plan view, it may be in line contact with a plurality of apertures 1c in plan view, as illustrated in FIGS. 3(a) and 3(b).

(Filter)

The aperture array of this embodiment can, for example, be used as a filter (sieve) for collecting an object (specimen) contained in fluid such as gas or liquid. The object can be, for example, an inorganic substance, an organic substance, a composite of these substances, or a biological substance contained in the fluid. In this description, the term "biological substance" refers to a substance derived from organisms, for example, a cell (eukaryote), a bacterium (eubacterium), and a virus. Examples of the cell (eukaryote) include an ovum, a sperm, an induced pluripotent stem cell (iPS cell), an ES cell, a stem cell, a mesenchymal stem cell, a mononuclear cell, a single cell, a cell mass, a floating cell, an adherent cell, a nerve cell, a white blood cell, a lymphocyte, a regeneration medical cell, a self-cell, a cancer cell, a circulating tumor cell (CTC), HL-60, HELA, and germs.

Examples of the bacterium (eubacterium) include a gram-positive bacterium, a gram-negative bacterium, a colon bacillus, and a tubercle bacillus. Examples of the virus include a DNA virus, an RNA virus, a rotavirus, an (avian) influenza virus, a yellow fever virus, a dengue fever virus, an encephalitis virus, a hemorrhagic fever virus, and an immunodeficiency virus. It is only necessary that the object should have a shape while existing in the fluid, and it is not limited to the solid, but may be, for example, liquid, sol, or gel.

Examples of the inorganic substance, the organic substance, the composite of these substances in the gas include PM (Particle Matter) 2.5, SPM (Suspended Particulate Matter), PM 10, and pollen in the atmosphere. PM 2.5 is particulate substance floating in the atmosphere, and has a particle diameter of about 2.5 μm or less.

The aperture array of this embodiment can also be applied to collect other objects besides the above-described objects. For example, the aperture array of the above embodiment can be used to filter cells in a liquid (for example, a total of 1 mL of PBS liquid containing 5×104 substantially spherical HL 60 having a diameter of 9 μm).

As a new inspection method for cancer, it has been studied to quantitate exosomes (endoplasmic reticulums) derived from the cancer cell in the blood. The size of the exosomes is about several hundreds of nanometers. The aperture array of the above embodiment can be applied to collect (filter and concentrate) only exosomes from a blood sample from which white blood cells, red blood cells, and the other blood cells are removed.

Since noroviruses cannot be cultured, they can be inspected only when much time elapses after the onset of illness and the number of viruses increases. However, as long as a small number of viruses can be collected (filtered and concentrated) by the aperture array, culture is unnecessary and quick inspection is possible. For this reason, the aperture array of the above embodiment can also be applied to such selective collection of viruses.

To "collect" the object is, for example, to physically hold the object in apertures of the filter or to directly or indirectly attach the object to the surface of the filter that is modified to easily attract the object.

While the size of the apertures 1c in the aperture array used as the filter is not particularly limited as long as the apertures 1c can collect the object, for example, it is preferably set so that the object cannot physically pass there through or cannot easily pass there through. When the aperture array is used as the filter, the size of the apertures 1c in the aperture array corresponds to the size of apertures in the filter.

The aperture ratio of the aperture array 1 (the ratio of the aperture area of the apertures 1c to the area of the principal surface of the aperture array including the apertures 1c) is preferably 3% or more, and more preferably 10% or more from the viewpoint of increasing the flow velocity of the fluid passing through the aperture array.

From the viewpoint of ensuring the strength of the aperture array, the aperture ratio is preferably 80% or less, and more preferably 60% or less. The thickness of the aperture array is preferably small within a range in which the required mechanical strength can be maintained. This is because, if the thickness of the aperture array increases, in general, the pressure loss increases when the fluid passes there through. When the pressure loss of the aperture array increases, the flow velocity decreases and it becomes difficult to pass the fluid through the aperture array. This decreases the treatment efficiency.

The thickness of the aperture array of this embodiment except for the projections is preferably 30 µm or less. The thickness is more preferably 24 µm or less, still more preferably 15 µm or less, further preferably 9 µm or less, and even further preferably 3 µm or less.

A comparison test was conducted for the thickness of the aperture array. Specifically, five types of aperture arrays having a aperture size (D) of 0.5 µm, a pitch (P) of 1.3 µm, and thicknesses shown in Table 1 were prepared, and pressure losses thereof were measured with Manostar gage. Table 1 and FIG. 8 show the relationship between the thickness and the pressure loss in the aperture array obtained from the results of the comparison test.

TABLE 1

| Thickness [µm] | Pressure loss [kPa] | Atmospheric pressure ratio |
| --- | --- | --- |
| 3 | 10 | 10% |
| 9 | 30 | 30% |
| 15 | 51 | 50% |
| 24 | 81 | 80% |
| 30 | 101 | 100% |

Figure 8:
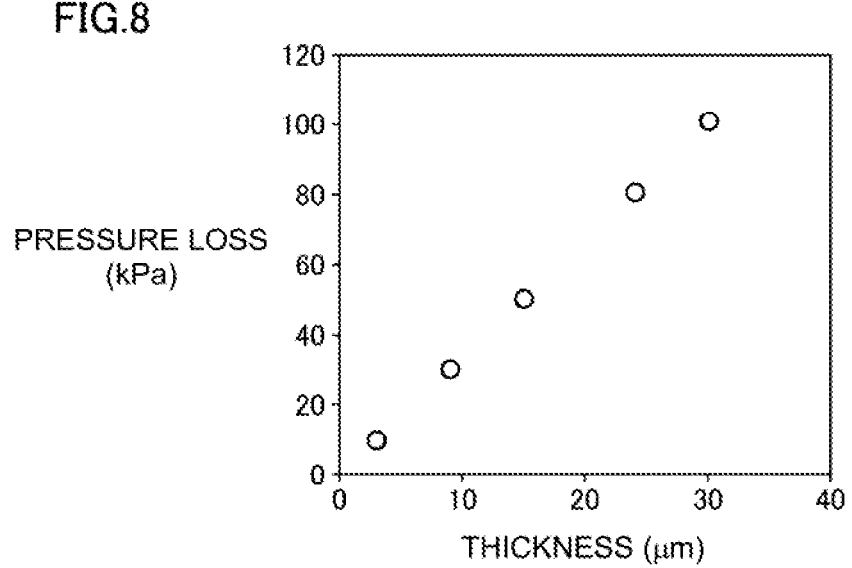
FIG. 8 is a graph showing the relationship between the thickness of the aperture array and the pressure loss.

The results shown in Table 1 and FIG. 8 show that, when the thickness is 30 µm or less, the pressure loss is lower than or equal to the atmospheric pressure (101.325 kPa). If the pressure loss exceeds the atmospheric pressure, trouble, such as breakage of the aperture array, is likely to occur. Therefore, it is shown that the thickness of the aperture array used as the filter is preferably 30 µm or less.

Since the aperture array of this embodiment is basically formed by a single layer, it is more advantageous in obtaining a thin aperture array than the aperture arrays disclosed in Patent Documents 1 to 4.

Since the aperture array of this embodiment is reinforced by the projections provided in the regions each abutting three or more apertures, the thickness thereof can be made smaller than before while maintaining sufficient strength. In this respect, the aperture array of this embodiment is also advantageous in obtaining a thin aperture array.

In the aperture array 1 of this embodiment, the aperture size of the apertures 1c is preferably 500 µm or less. The pitch is preferably 1300 µm less. This is because these values allow particles in the order of microns to be trapped by the filter. The aperture size of the apertures 1c is more preferably 5 µm or less. The pitch is more preferably 13 µm or less. This is because these values allow particles in the order of sub microns to be trapped by the filter.

In the aperture array 1, it is preferable that the first principal surface 1a should have no projections, and more preferable that the first principal surface 1a should be flat. When easily damaged objects (for example, cells) are filtered using the aperture array 1, they can be filtered without being damaged as long as they are trapped on the first principal surface 1a.

The surface of the aperture array used as the filter may be modified to easily attract the object. The size of the apertures 1c in the aperture array may be such that the object can physically pass there through within a range in which the object can be chemically collected by this surface modification.

Modification to easily attract the object is, for example, coating with a material that has high affinity for the object. Besides, the surface of the aperture array may be subjected to modification that couples a host molecule so that the object is coupled to the host molecule. Here, the host molecule is, for example, a molecule to which the object can be specifically coupled. Examples of the combination of the host molecule and the object include an antigen and an antibody, a sugar chain and protein, lipid and protein, a low-molecular compound (ligand) and protein, protein and protein, and a single-stranded DNA and a single-stranded DNA.

(Measuring Device)

A aperture array (filter) that collects object can be irradiated with an electromagnetic wave, and can be used as a measuring device that measures the amount or characteristics of the object (measurement object) by using the electromagnetic wave characteristics of the aperture array.

While various known mechanisms can be used as the measuring method using the electromagnetic wave characteristics of the aperture array, for example, infrared spectroscopy, such as FT-IR (Fourier Transform Infrared spectroscopy), and terahertz time domain spectroscopy (THz-TDS) are used.

An electromagnetic wave used for measurement is, for example, an electromagnetic wave that can cause scattering according to the structure of the filter (the aperture array), and specifically, examples of the electromagnetic wave include a radio wave, infrared rays, visible light, ultraviolet light, X-rays, and gamma rays. While the frequency of the electromagnetic wave is not particularly limited, it is preferably 1 GHz to 1 PHz, and more preferably 20 GHz to 200 THz (terahertz wave).

As the electromagnetic wave, for example, a linearly polarized electromagnetic wave (linear polarized wave) having a predetermined polarization direction and an unpolarized electromagnetic wave (unpolarized wave) can be used. Examples of the linearly polarized electromagnetic wave include a terahertz wave generated from a short pulse laser serving as a light source by an optical rectification effect of electro optical crystal such as ZnTe, visible light emitted from a semiconductor laser, and an electromagnetic wave radiated from a photoconductive antenna. The unpolarized electromagnetic wave is, for example, infrared light radiated from a high-pressure mercury lamp or a ceramic lamp.

Since the projections are provided in the regions where they each abut three or more apertures in the aperture array of this embodiment, measurement sensitivity is high, and this allows measurement of a smaller amount of measurement object.

Second Embodiment

Figure 4A:
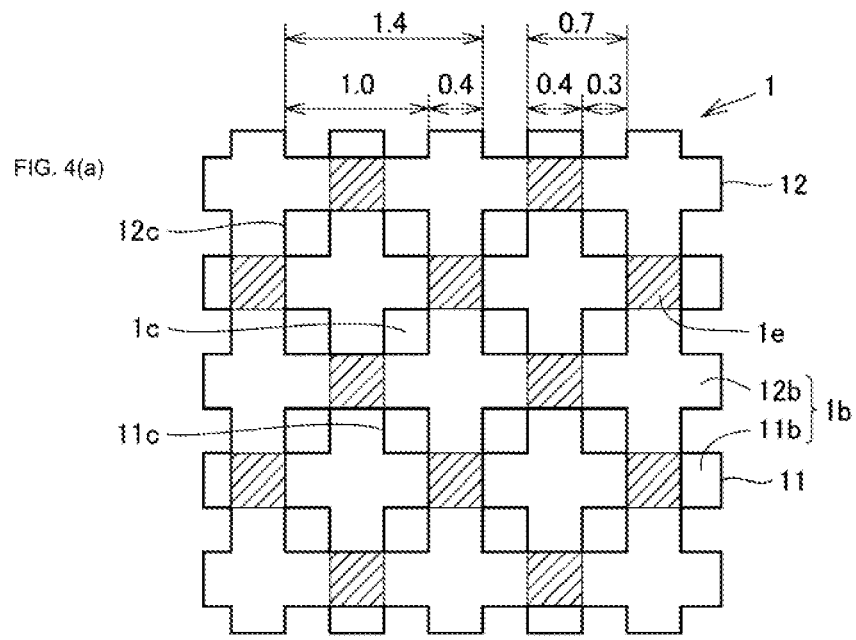
FIG. 4(a) is a schematic plan view illustrating a structure of an aperture array according to a second embodiment of the invention.
Figure 4B:
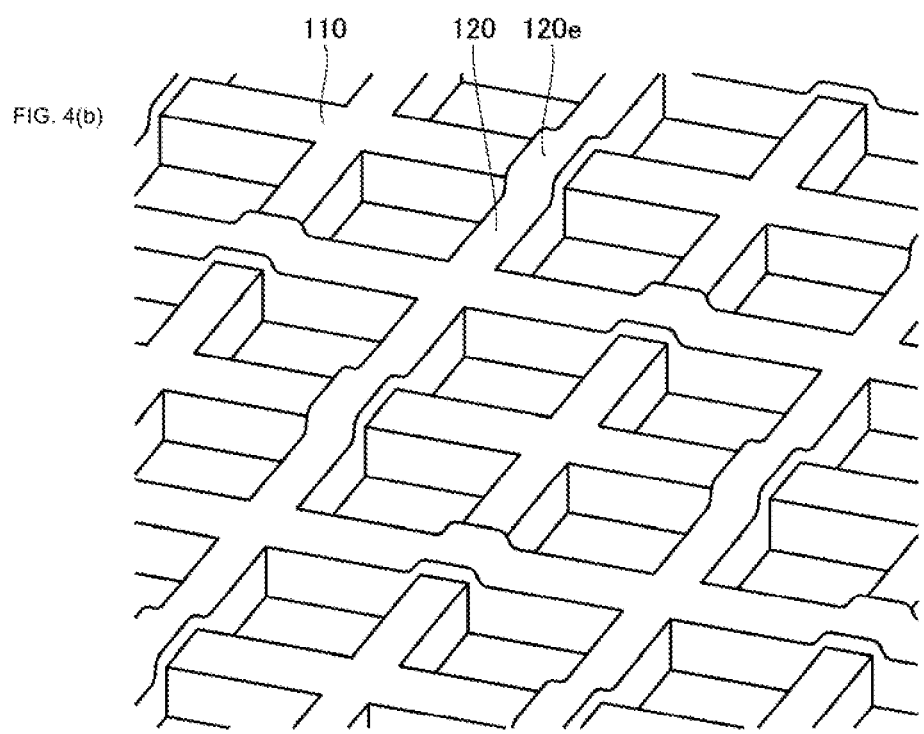
FIG. 4(b) is schematic perspective view illustrating a structure of an aperture array according to a second embodiment of the invention.

Referring to FIGS. 4(a) and 4(b), an aperture array 1 according to this embodiment has such a shape that a film-shaped first pattern 11 having a plurality of first apertures 11c penetrating in the normal direction of the principal surface and a film-shaped second pattern 12 having a plurality of second apertures 12c penetrating in the normal direction of the principal surfaces 1a and 1b. The front flat surfaces of the first and second patterns 11 and (corresponding to the first principal surface 1a) lie in the same plane. The first and second patterns 11 and 12 cooperate for form the aperture array.

When viewed in plan from the normal direction of the first principal surface 1a (and, in the preferred embodiment, normal to the direction of the second principal surface 1b), each of the first apertures 11c in the first pattern 11 overlaps with a respective set of four of the second apertures 12c in the second pattern 12. Conversely, each of the second apertures 12c in the second pattern 12 overlaps with a respective set of four of the first apertures 11c in the first pattern 11. These overlapping portions of the plural first apertures 11c and the plural second apertures 12c cooperate to define apertures 1c of the aperture array 1. The apertures of the aperture array 1 are small in size than the first and second apertures 11c, 12c.

The aperture array of this embodiment is different from that of the first embodiment in that projections projecting in the normal direction of the first principal surface 1a (and, in the preferred embodiments, the normal direction of the second principal surface 1b) are provided on the second principal surface 1b (surface formed by the combination of the principal surface 11b of the first pattern 11 and the principal surface 12b of the second pattern 12) only in the overlapping portions (intersecting regions 1e) of the first and second patterns 11 and 12.

The first pattern 11 and the second pattern 12 have a shape similar to that of the aperture array 1 illustrated in FIGS. 2(a) and 2(b). The first pattern 11 includes a pair of principal surfaces 11a and 11b opposed to each other and first apertures 11c. Similarly, the second pattern 12 includes a pair of principal surfaces 12a and 12b opposed to each other and second apertures 12c.

In the aperture array of this embodiment, according to the above-described structure, the apertures 1c are smaller than both the apertures of the first pattern 11 (first apertures 11c) and the apertures of the second pattern 12 (second apertures 12c). For example, as illustrated in FIG. 4(a), when both the first apertures 11c and the second apertures 12c have a aperture size (D in FIG. 2(a)) of 1.0 μm and a pitch (P in FIG. 2(a)) of 1.4 μm, the apertures 1c have a aperture size of 0.3 μm and a pitch of 0.7 μm.

In the aperture array of this embodiment, the ratio of the portions of the apertures that define the through apertures is more easily increased than when one of the apertures in one of the aperture array parts overlaps with only one of the apertures of the other aperture array part, as in the aperture array disclosed in Patent Documents 1 and 2. Therefore, the aperture array of this embodiment can better suppress reduction in the aperture ratio and, for example, filtering efficiency and efficiency of measurement with electromagnetic waves, as compared with the aperture array disclosed in Patent Document 1 and 2.

Figure 5:
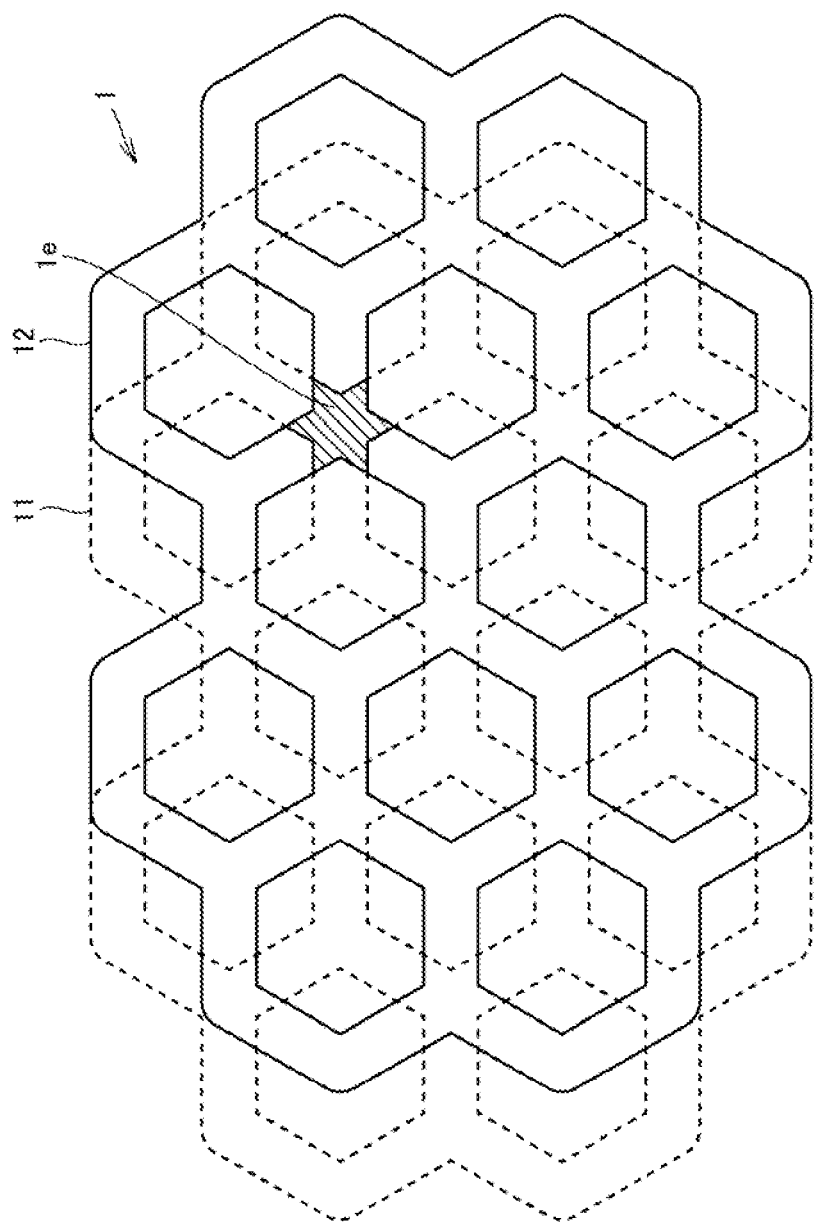
FIG. 5 is a schematic plan view illustrating a structure of a modification of the aperture array according to the second embodiment.
Figure 6:
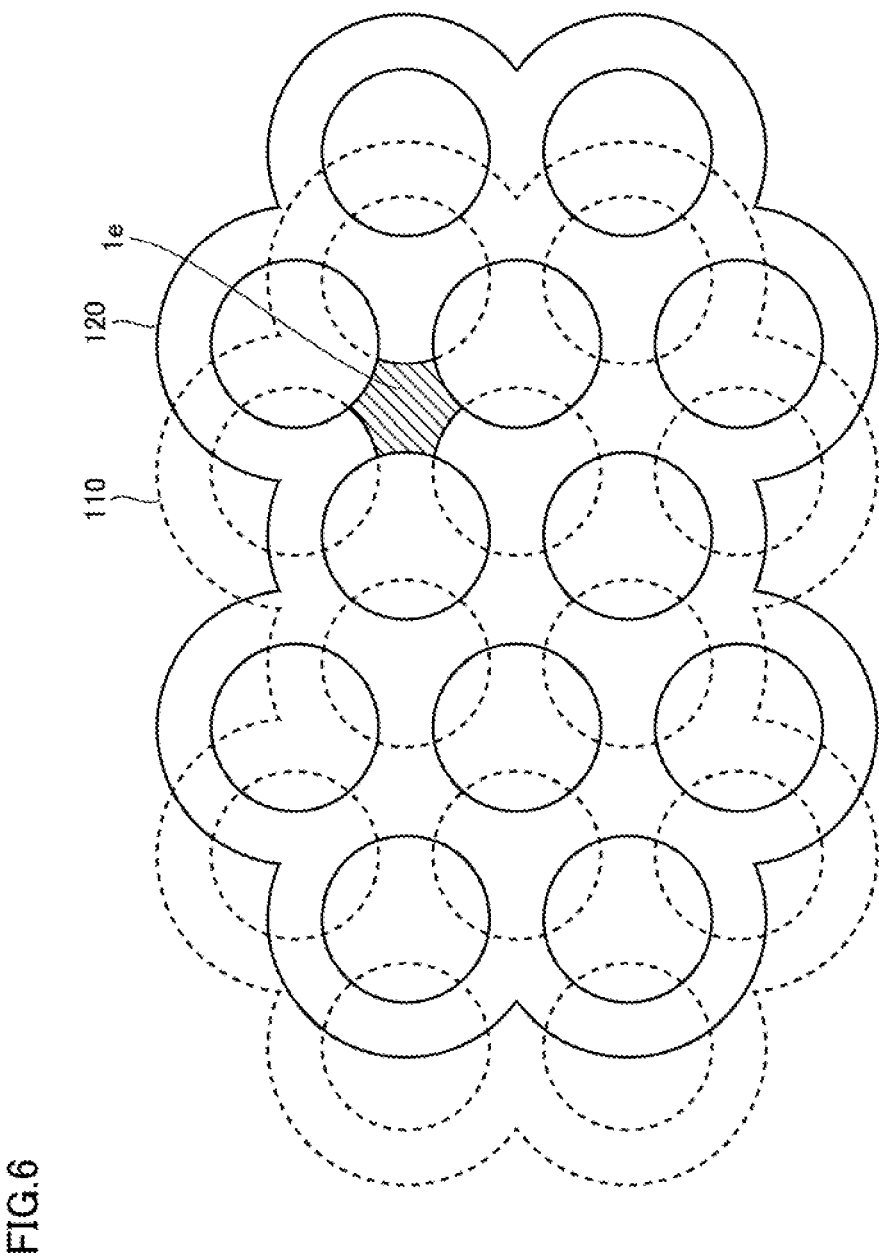
FIG. 6 is a schematic plan view illustrating a structure of another modification of the aperture array according to the second embodiment.

FIGS. 5 and 6 illustrate modifications of the aperture array of this embodiment. In the modification illustrated in FIG. 5, a first pattern 11 and a second pattern 12 have a honeycomb-shaped structure having regular hexagonal apertures. In the modification illustrated in FIG. 6, a first pattern 11 and a second pattern 12 have a honeycomb-shaped structure having circular apertures. In these modifications, one of the apertures in one of the patterns overlaps with three apertures in the other pattern.

In the aperture arrays 1 illustrated in FIGS. 5 and 6, projections projecting from the second principal surface in the normal direction of the second principal surface are provided in intersecting regions 1e where the first pattern 11 and the second pattern 12 overlap with each other. While only one intersecting region 1e is illustrated in FIGS. 5 and 6 for simplicity, in actuality, all overlapping portions of the first pattern 11 and the second pattern 12 serve as intersecting regions 1e.

The shape of the aperture array of this embodiment is not limited to the above-described shapes. The aperture array may be formed by first and second patterns 11 and 12 having, for example, regular triangular or regular octagonal apertures.

In the aperture array 1 of this embodiment, a plurality of regions 1d (regions 1d in FIG. 1), each abutting a respective set of three or more of the plural apertures 1c, on the second principal surface 1b (when viewed in plan from the normal direction of the second principal surface 1b) alternately serve as the intersecting regions 1e, and the projections are provided only in the intersecting regions 1e. That is, projections are provided in the alternate regions 1d. Thus, when objects larger than the size of the apertures 1c are collected, they can be stably trapped on the aperture array 1. Further, cohesion of the objects can be suppressed, and the objects can be trapped while being dispersed on the principal surface of the aperture array 1.

The projections do not always need to be provided in all of the intersecting regions 1e, but may be provided in some of the plural intersecting regions 1e.

Similarly to the first embodiment, in the aperture array of this embodiment, each of the projections abut a respective set of three or more apertures. Hence, the measurement sensitivity increases and a smaller amount of measurement object can be measured. To verify these effects, the following simulation calculation was performed.

Figure 9A:
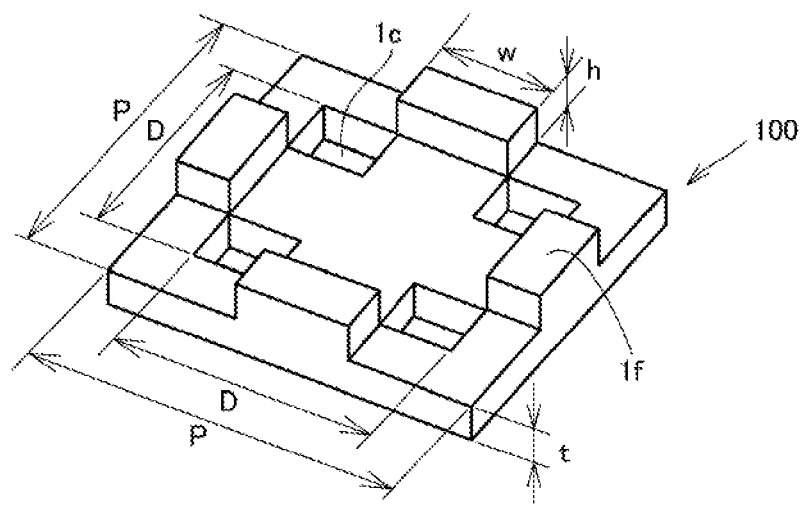
FIG. 9(a) is a schematic plan view illustrating a unit structure of an aperture array in accordance with the second embodiment of the present invention.
Figure 9B:
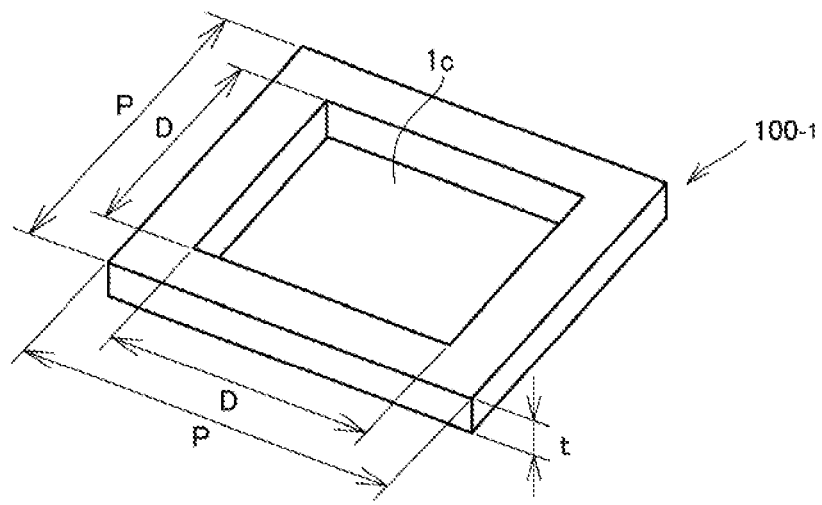
FIG. 9(b) is a schematic plan view illustrating a unit structure of an aperture array of a first comparative example.
Figure 9C:
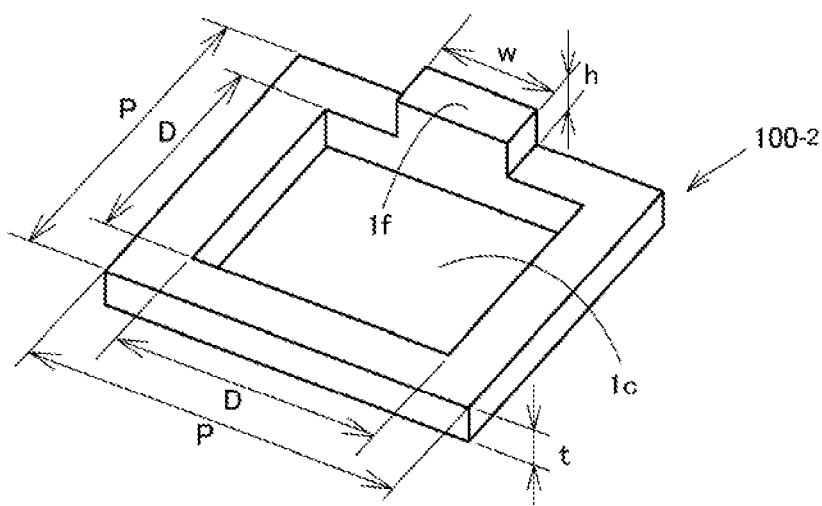
FIG. 9(c) is a schematic plan view illustrating a unit structure of an aperture array of a second comparative example.

Referring to FIG. 9(a) through 9(c), three different unit structures 100, 100-1 and 100-2 are shown. Each unit structure shows the structure of the aperture array surrounding a single aperture in the aperture array. Unit structure 100, formed in accordance with the present invention, is illustrated in FIG. 9(a). This embodiment has four projections 1f. An aperture array according to a first comparative example is composed of a unit structures 100-1 illustrated in FIG. 9(b). The aperture array of the first comparative example is a conventional aperture array having no projections as illustrated in FIG. 2. Further, a aperture array 100-2 according to a second comparative example is composed of unit structures illustrated in FIG. 9(c). The aperture array of the second comparative example corresponds to the conventional aperture array illustrated in FIG. 1 of International Publication No. 2012/29629.

The parameters of the unit structures that form the aperture arrays are shown in Table 2.

TABLE 2

| | First example | First comparative example | Second comparative example |
|---|---|---|---|
| Aperture size: D | 0.5 μm | 1.8 μm | 1.8 μm |
| Pitch: P | 1.3 μm | 2.6 μm | 2.6 μm |
| Line width = P − D | 0.8 μm | 0.8 μm | 0.8 μm |
| Thickness: t | 0.8 μm | 0.8 μm | 0.8 μm |
| Height of projections | 0.8 μm | -(no projection) | 0.8 μm |

Figure 10A:
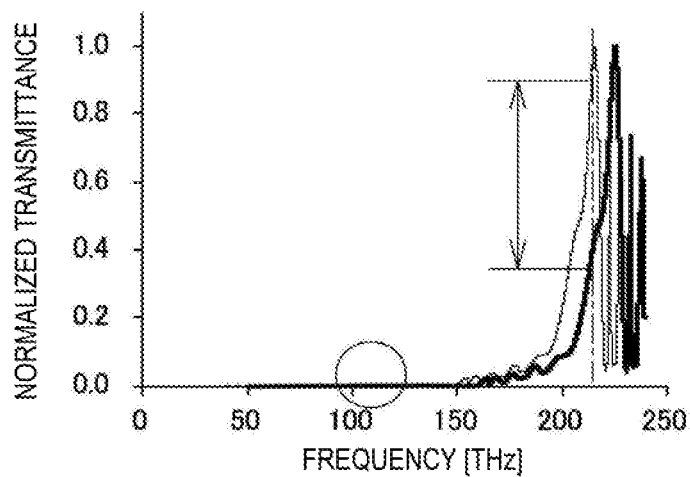
FIG. 10(a) through 10(c) are transmittance spectra showing simulation results to explain the effect of the aperture array of the second embodiment used as a measuring device.
Figure 10B:
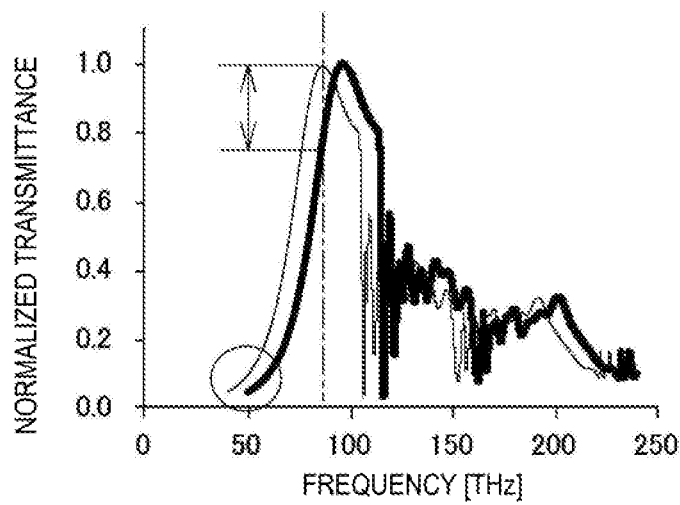
Figure 10C:
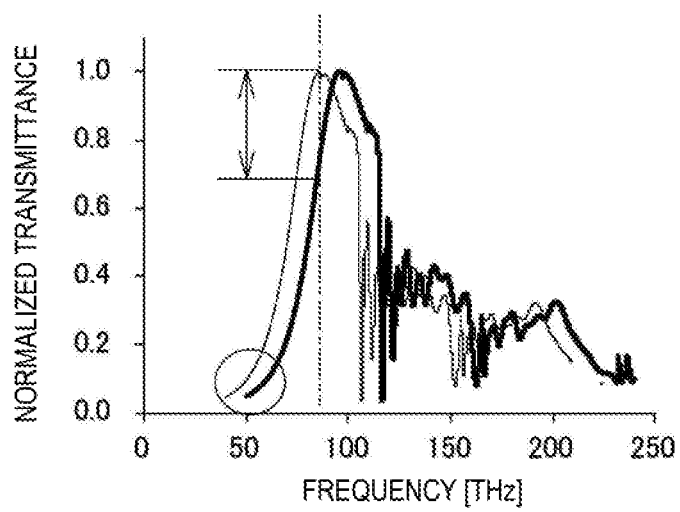

The above-described aperture arrays of the first example, the first comparative example, and the second comparative example were subjected to electromagnetic-field simulation (Micro-stripes) using an FDTD method (Finite-difference time-domain method). FIGS. 10(a) to 10(c) respectively show transmittance spectra of the first example, the first comparative example, and the second comparative example obtained by the simulation. In the figures, a thick line shows the transmittance spectrum only of the aperture array, and a thin line shows the transmittance spectrum of the aperture array with a measurement object (a dielectric film having a thickness of 0.1 μm) added on its surface.

Conditions of the electromagnetic-field simulation were set such that a first principal surface of the aperture array 1 was an incident surface, a second, opposite surface was an observation surface, and the remaining surfaces were periodic boundaries. Further, the material of the aperture array (base grating) was Ni. As an electromagnetic wave, a plane wave, whose polarization plane (electric-field plane) extended in the Y-direction, was perpendicularly incident from a wave source on the principal surface of the grating unit. The electromagnetic wave that has passed through the aperture array was detected on the observation surface provided on the side opposite from the wave source for the plane wave. The distance between the wave source for the plane wave and the base grating was 270 μm, and the distance between the base grating and the observation surface was 270 μm. The transmittance spectra shown in FIGS. 10(a) to 10(c) show that the spectrum near the peak point in the first example is sharper than in the first and second comparative examples.

Also, when substances adhere to the metal mesh (one example of an aperture array), the frequency of the spectrum after adhesion of the measurement objects (thin line) shifts from that before adhesion (thick line). The transmittance difference (difference shown by the two headed arrow in the figures) of the peak point frequency (frequency at the peak maximum value of the spectrum after adhesion shown by the thin line in the figure) resulting from this shift change is larger in the first example than in the first and second comparative examples. Therefore, when the substances adhering to the aperture array are detected by the transmittance difference due to the shift change, the first example is superior.

Since the aperture 1c is divided into four section in the first example, the pitch is 1.3 μm in the first example whereas the pitch is 2.6 μm in the first and second comparative examples. For this reason, the peak point shifts toward the high-frequency side.

When the reference point of the transmittance before and after adhesion is set at, for example, ½ of the wavelength at the peak point (the encircled portions of the figures), the reference cannot be set because of the existence of the transmittance difference in the first and second comparative examples. In contrast, in the first example, since the transmittance difference is not formed before and after adhesion, calibration can be performed using the reference point. Further, in the example, even when the reference point of the transmittance before and after adhesion is set at ⅔ of the peak point, calibration can be performed using the reference point because the transmittance difference is not formed. Calibration using the reference point can reduce error factors in spectrum analysis, and this can increase the detection sensitivity to a small amount of substance.

(Production Method)

The aperture array of this embodiment has the projections in the overlapping portions of the first pattern 11 and the second pattern 12, as described above, can be easily produced by the following production method.

The production method for the aperture array of this embodiment basically includes:

forming a first structure 110 corresponding to a first pattern 11; and forming a second structure 120 corresponding to a second pattern 12 and obtaining a aperture array 1 by connecting the first structure 110 and the second structure 120.

These steps will be described below with reference to FIG. 7(a) through 7(i).

Figure 7:
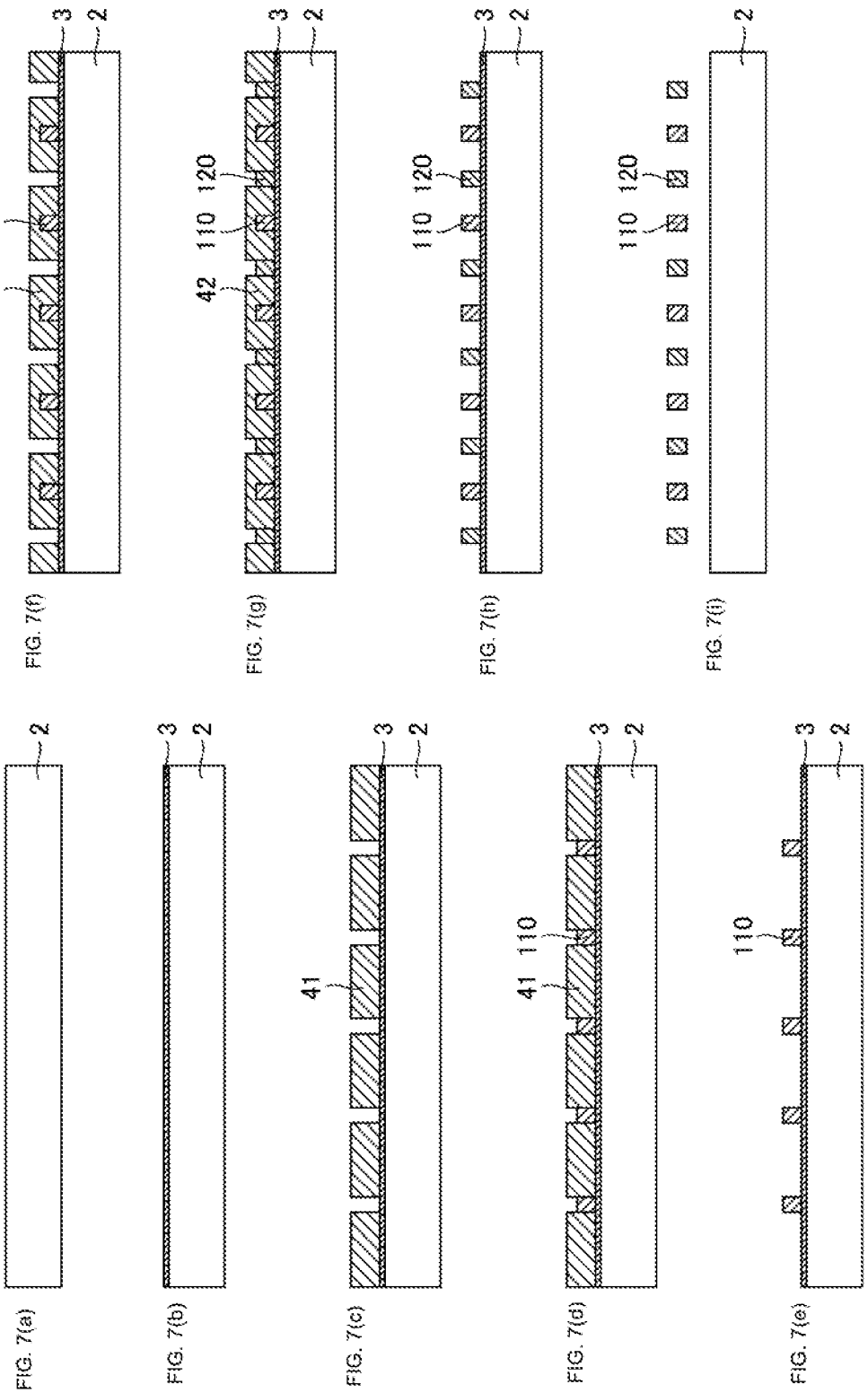
FIG. 7(a) through 7(i) are cross-sectional views explaining a production method for the aperture array of the second embodiment.

As shown in FIG. 7(a), a first structure 110 corresponding to a first pattern 11 is formed on a metal film 3 by a predetermined patterning process according to a deposition method. While the substrate 2 is not particularly limited, it is formed of, for example, Si.

Next, referring to FIG. 7(b), a Ti film and a Cu film are formed on the substrate 2 in this order by sputtering to form a laminated film (metal film 3) composed of the Ti film and the Cu film. While this metal film 3 is a layer to be removed by etching in a later step, it also functions as a seed layer for Ni plating when a first pattern is formed.

While the thickness of the metal film 3 is not particularly limited, since the metal film 3 is to be partly removed in the later step, it is preferably thin within a range in which the aperture array of this embodiment can be obtained. Specifically, for example, the thickness of the metal film 3 is 100 to 600 nm. For example, the thickness of the Ti film may be about 20 nm, and the thickness of the Cu film may be about 200 to 500 nm.

Next, referring to FIG. 7(c), a first resist 41 is formed, for example, on the metal film 3. The first resist 41 can be formed by photolithography. The first resist 41 is patterned to have openings at a position corresponding to a portion where the first structure 110 is to be formed, and is patterned to form a film-shaped first structure 110 having a plurality of first apertures 11c penetrating in the normal direction of the principal surface.

Next, referring to FIG. 7(d), a first structure 110 (Ni film) is formed on a surface of the metal film 3 exposed from the openings of the first resist 41 by plating. In this way, the film-shaped first structure 110 having a plurality of first apertures 11c penetrating in the normal direction of the principal surface is formed.

Referring to FIG. 7(e), the first resist 41 is removed by a stripping method. By thus stripping the first resist 41 after formation of the first structure 110 and before forming the second structure 120, the first structure 110 and a second structure 120 (to be described later) can be formed so that they cooperate to form a flat (planar) first principal surface 1a. Thus, the thickness of the aperture array 1 finally obtained can be made smaller than when the first structure 110 and the second structure 120 are simply stacked.

The second structure 120, corresponding to a second pattern 12, is formed on the first structure 110 by a predetermined patterning process according to a deposition method. First, referring to FIG. 7(f), a second resist 42 is formed on the metal film 3 and the first structure 110. The second resist 42 is patterned to have openings at a position corresponding to a portion where the second structure 120 is to be formed, and is patterned to form a film-shaped second structure 120 having a plurality of second apertures 12c penetrating in the normal direction of the principal surface.

As illustrated in FIG. 4(a), patterning is designed so that each of the first apertures 11c overlaps with a respective set of four second apertures 12c and each of the second apertures 12c overlaps with a respective set of four first apertures 11c, when viewed in plan from the normal direction of the first and second principal surfaces 1a and 1b. Thus, overlapping portions of the plural first apertures 11c and the plural second apertures 12c serve as apertures 1c of the aperture array 1.

In this embodiment, the second resist 42 has the same shape as that of the first resist 41, and is different from the first resist 41 only in the arrangement position (position in the horizontal direction of the first principal surface 1a). More particularly, the first and second resists 41 and 42 are formed to be shifted from each other so that the overlapping portions of the plural first apertures in the first pattern 11 and the plural second apertures in the second pattern are uniform in size and shape. This allows the resulting aperture array 1 to become a quasiperiodic structure or a periodic structure. For example, to obtain the aperture array illustrated in FIG.

4, patterning is performed so that the first and second patterns 11 and 12 are shifted by a half pitch in the vertical and horizontal directions.

The aperture ratio of the aperture array 1 can be adjusted, for example, by design of the aperture size of the apertures shown by D in FIG. 2(b) and the grating interval (pitch) of the apertures shown by P in FIG. 2(b) in the first and second patterns 11 and 12 and arrangement design of the first and second patterns 11 and 12.

Next, referring to FIG. 7(g), a second structure 120 (Ni film) is formed on the surfaces of the metal film 3 and the first structure 110 exposed from the openings of the second resist 42 by plating. Thus, as illustrated in FIG. 4(b), the second structure 120 is formed to include projections 120e projecting in the normal direction of the second principal surface on the second principal surface in intersecting regions 1e (overlapping portions of the first pattern 11 and the second pattern 12).

Next, referring to FIG. 7(h), the second resist 42 is removed by the stripping method. Finally, referring to FIG. 7(i), the metal film 3 is removed by etching. For example, the etching method is preferably a method for immersing a precursor of the aperture array obtained in the above step in an etchant for melting the metal film. The etchant may then cleaned off by rinsing using pure water. Drying is then performed.

Through the above-described method, the aperture array 1 of this embodiment composed of the first structure 110 and the second structure 120 can be obtained.

While the first and second structures are formed by using the resists in this embodiment, they may be formed by other methods. For example, the first structure and the second structure may be formed by vapor deposition of metal or resin. When the first structure and the second structure are made of resin, they may be formed by patterning photo curable resin.

According to the production method for the aperture array of this embodiment, the apertures 1c are smaller than both the apertures (first apertures 11c) of the first pattern 11 and the apertures (second apertures 12c) of the second pattern 12. For this reason, it is relatively easy to form fine apertures 1c using only first and second structures having relatively large apertures.

While the combination of the materials of the first and second structures 110 and 120 is not particularly limited, the same kind of materials are preferably combined from a viewpoint of obtaining uniform characteristics in the aperture array.

The first pattern 11 and the second pattern 12 are preferably the same, for example, in the size, shape, and pitch of the apertures. In this case, through apertures having a uniform size can be regularly arranged in the aperture array. Thus, the aperture array can perform precise filtration as the filter, and can perform high-accuracy measurement as the measuring device.

However, special characteristics may be imparted to the aperture array by changing, for example, the materials used for the first and second structures 110 and 120, the size and shape of the first and second structures 110 and 120 and/or the pitch of the apertures of the first and second patterns 11 and 12. For example, when the first structure 110 is formed by a conductor and the second structure 120 is formed by an insulator, a response that is highly dependent on the periodic structure of the first structure 110 can be obtained in detection of a small amount of substance using the electromagnetic wave, and the size, shape, and pitch of the apertures in the second structure 120 can be arbitrarily designed according to the object to be detected.

It should be considered that the embodiments disclosed herein are illustrative in all respects, and are not restrictive. The scope of the present invention is shown not by the above description but by the scope of the claims, and it is intended to include all modifications within the meaning and scope equivalent to the scope of claims. For example, it is possible to design a aperture array composed of three or more layers including a plurality of combined patterns in addition to superposition of the first pattern and the second pattern as in the embodiments of the present invention.

REFERENCE SIGNS LIST 1 aperture array
1a first principal surface
1b second principal surface
1c aperture
1d region
1e intersecting region
1f projection
2 substrate
3 metal film
11 first pattern
11a, 11b principal surface
11c first aperture
12 second pattern
12a, 12b principal surface
12c second aperture
41 first resist
42 second resist
100, 100-1 and 100-2 unit structure
110 first structure
120 second structure
120e projection

The invention claimed is:

1. A method for filtering objects from a fluid stream, comprising the steps of:
   providing only a single layer aperture array having a thickness of 30 microns or less, said single layer aperture array comprising:
      first and second opposed principal surfaces, the second principal surface being planar;
      a plurality of apertures penetrating the first and second principal surfaces,
   defining fluid passages across the thickness of said single layer aperture array; and
      at least one projection projecting from the second principal surface in a direction normal to the second principal surface and extending away from the first principal surface, at least one of the at least one projections abutting a respective set of three or more of the apertures;
   passing a fluid containing objects to be captured through the apertures of said single layer aperture array; and
   capturing some of the objects on said single layer aperture array.

2. The method of claim 1, wherein the fluid is passed through the apertures in a direction extending from the first principal surface to the second principal surface.

3. The method of claim 2, wherein said single layer aperture array has a plurality of projections projecting from the second principal surface in a direction normal to the second principal surface and extending away from the first principal surface, each of the plurality of projections abutting a respective set of three or more apertures.

4. The method of claim 1, wherein said single layer aperture array has a plurality of projections projecting from the second principal surface in a direction normal to the second principal surface and extending away from the first principal surface, each of the plurality of projections abutting a respective set of three or more apertures.

5. The method of claim 1, wherein the objects are captured on the first principal surface of said single layer aperture array.

6. The method of claim 1, wherein the first surface of the aperture array has been modified to attract the objects.

7. The method of claim 6, wherein said surface modification is coating the first surface of said single layer aperture array with a material that has an affinity for the objects.

8. The method of claim 6, wherein the objects are biological cells and are collected by the surface modification.

9. The method of claim 8, wherein the first surface of said single layer aperture array has been modified by attaching a host molecule to which the biological cells can be coupled to the first surface of said single layer aperture array.

10. The method of claim 1, wherein the first and second opposed principal surfaces of said single layer aperture array are planar surfaces and extend parallel to one another.

* * * * *